(12) United States Patent
Ho et al.

(10) Patent No.: US 9,026,463 B1
(45) Date of Patent: May 5, 2015

(54) METHOD AND SYSTEM TO DISTRIBUTE ONLINE VIDEO

(71) Applicant: TP Lab, Inc., Palo Alto, CA (US)

(72) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 37 days.

(21) Appl. No.: 13/628,053

(22) Filed: Sep. 27, 2012

Related U.S. Application Data

(62) Division of application No. 13/211,294, filed on Aug. 16, 2011, now Pat. No. 8,315,916, and a division of application No. 11/743,558, filed on May 2, 2007, now Pat. No. 8,032,421.

(51) Int. Cl.
*G06Q 30/00* (2012.01)
*G06Q 30/06* (2012.01)

(52) U.S. Cl.
CPC ............ *G06Q 30/0601* (2013.01); *G06Q 30/06* (2013.01)

(58) Field of Classification Search
CPC ....... G06Q 30/00; G06Q 30/02; G06Q 30/04; G06Q 30/06; G06Q 30/0241; G06Q 30/382; G06F 21/10; G06F 21/069; G06F 8/315; G06F 3/011; G06T 19/006; G06T 13/40; G09G 5/00; G09G 5/377; H04N 21/2347; H04N 21/2541; H04N 21/2543; H04N 21/25891; H04N 21/441; H04N 21/44204; H04N 21/4627; H04N 7/17318; H04L 67/02; H04M 1/72525; H04W 92/08
USPC ............ 705/26.1, 27.1, 51, 52, 64, 14.4, 901, 705/903; 345/419, 633; 377/328; 725/92; 709/203, 219, 214; 348/E7.071, E7.73; 707/E17.032, E17.116
See application file for complete search history.

(56) References Cited

U.S. PATENT DOCUMENTS

| | | | |
|---|---|---|---|
| 7,133,905 B2 * | 11/2006 | Dilley et al. .................. | 709/219 |
| 7,263,497 B1 * | 8/2007 | Wiser et al. ..................... | 705/51 |
| 2002/0069420 A1 * | 6/2002 | Russell et al. .................. | 725/92 |
| 2003/0037124 A1 * | 2/2003 | Yamaura et al. ............... | 709/219 |
| 2004/0107109 A1 * | 6/2004 | Nakanishi et al. ................ | 705/1 |
| 2005/0091164 A1 * | 4/2005 | Varble ............................. | 705/52 |

\* cited by examiner

*Primary Examiner* — Yogesh C Garg
(74) *Attorney, Agent, or Firm* — North Shore Patents, P.C.; Michele Liu Baillie

(57) ABSTRACT

An online video distribution network includes an online video portal and an online video merchant. In one embodiment, when the consumer orders a video, the merchant provides a pick-up ticket to the consumer. The portal uses the merchant identity in the pick-up ticket to connect to the merchant, and the merchant uses a product identity in the pick-up ticket to retrieve and send the video to the portal. In another embodiment, the portal provides the consumer with a drop-off ticket, which is provided to the merchant. The merchant connects to the portal using the portal identity in the drop-off ticket, and sends the video and a customer identity in the drop-off ticket to the portal. The portal determines a consumer record associated with the consumer identity and stores the video in the consumer record. The consumer can then easily access the video at the portal.

5 Claims, 3 Drawing Sheets

METHOD AND SYSTEM TO DISTRIBUTE ONLINE VIDEO

CROSS-REFERENCE TO RELATED APPLICATIONS

The present application is a divisional of co-pending U.S. patent application Ser. No. 13/211,294, filed on Aug. 16, 2011, which in turn is a divisional of U.S. Pat. No. 8,032,421, filed on May 2, 2007 and issued on Oct. 4, 2011.

BACKGROUND OF THE INVENTION

1. Field

This invention relates generally to media, particularly to a system and method to distribute online video.

2. Related Arts

Watching movies is an entertainment of choice for most people. With a good quality television set equipped with a VCR or DVD player, people can enjoy home theatre experience rivaling that of a cinema, all in the comfort of a living room.

People used to buy or rent movies from local merchants. With the advent of the Internet, many merchants are deploying innovative ways to deliver movies to enthusiasts. For example, NetFlix offers online movie rental and delivers the movies via postal service. Motivated by the success of online music download, e-commerce merchants such as Walmart.com, Amazon.com and iTunes are trotting out movie download purchase as well.

At the same time, storing personal media content, such as videos and photos, in the Internet has become popular, particularly among the young generation. Internet portals offer storage for this purpose. This allows easy access of personal media content, such as viewing from different locations or sharing with friends.

In one example, a college student Keith stores his videos in YouTube so that he can access his collection when he is in school, and when he visits his parents across town during weekends. He purchases a movie from Walmart.com and wants to store his videos in YouTube. Keith finds the upload procedure inconvenient and slow, taking over 3 hours to complete.

In another example, Bret rents a movie from an online merchant. He plans to watch the movie in his girlfriend's apartment after work. After downloading the movie from the online merchant, Bret has to copy the movie to a DVD disc so that he can bring it along. Bret wishes there is a convenient way for the merchant to deliver the movie to his online media storage so they can watch the movie from her apartment.

In one more example, Roger downloads a movie he just purchased to his hard-drive based digital video recorder. The recorder is connected to the big screen television in the family room. There is no easy way for Roger to watch the movie from his bedroom.

The above illustrates a need for a system and method to distribute online video for easy personal access.

BRIEF SUMMARY OF THE INVENTION

An online video distribution network includes an online video portal and an online video merchant. In one embodiment, when the consumer orders a video, the merchant provides a pick-up ticket to the consumer. The portal uses the merchant identity in the pick-up ticket to connect to the merchant, and the merchant uses a product identity in the pick-up ticket to retrieve and send the video to the portal. In another embodiment, the portal provides the consumer with a drop-off ticket, which is provided to the merchant. The merchant connects to the portal using the portal identity in the drop-off ticket, and sends the video and a customer identity in the drop-off ticket to the portal. The portal determines a consumer record associated with the consumer identity and stores the video in the consumer record. The consumer can then easily access the video at the portal.

DETAILED DESCRIPTION OF THE INVENTION

Figure 1:
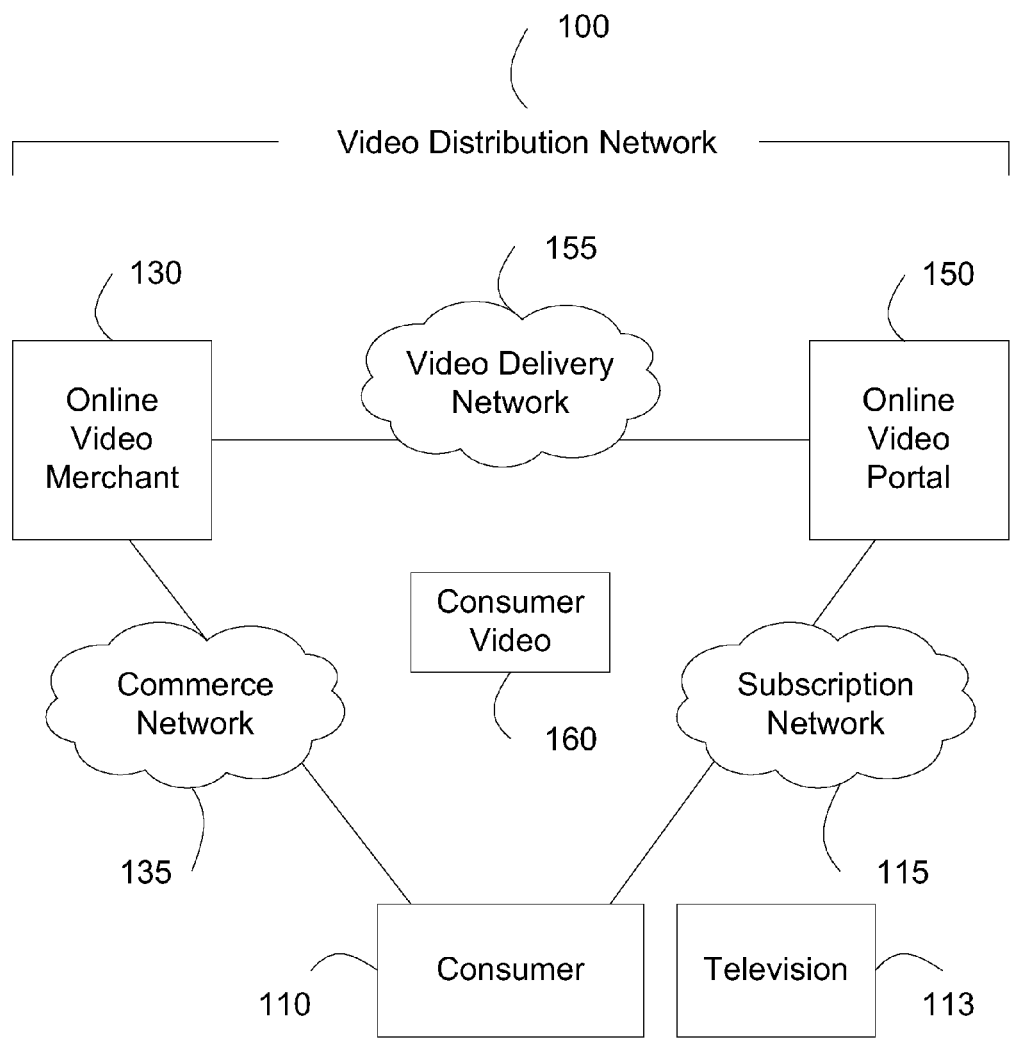
FIG. 1 illustrates an online video distribution network for consumer viewing.

FIG. 1 illustrates an online video distribution network for consumer viewing.

Online video distribution network 100 includes online video portal 150. Consumer 110 subscribes to online video portal 150. The subscription allows consumer 110 to access consumer video 160 over subscription network 115. Consumer video 160 belongs to consumer 110. The access includes viewing consumer video 160.

In one embodiment, consumer video 160 is a movie. In one embodiment, consumer video 160 is an animation, television series or a documentary. In one embodiment, consumer video 160 is an instructional video for health and fitness, cooking or tennis. In one embodiment, consumer video 160 is a short video clip. In one embodiment, consumer video 160 is a sport event or beauty pageant production. In one embodiment, consumer video 160 is an opera or play performance.

In one embodiment, subscription network 115 includes a cable television network. In one embodiment, subscription network 115 includes a satellite television network. In one embodiment, subscription 115 includes an Internet Protocol television (IPTV) network. In one embodiment, subscription network 115 includes a mobile television network based on, for example, MediaFlow, Digital Video Broadcasting—Handheld (DVB-H) or Digital Multimedia Broadcasting (DMB) technology. In one embodiment, subscription network 115 includes the Internet. In one embodiment, subscription network includes a telephone network.

Consumer 110 views consumer video 160 using a television 113 connected to subscription network 115. In one embodiment, television 113 includes a set top box. In one embodiment, television 113 includes a mobile phone, or a personal media player.

Online video distribution network 100 includes online video merchant 130. Consumer 110 orders consumer video 160 from online video merchant 130 over commerce network 135 and requests online video merchant 130 to deliver consumer video 160 to online video portal 150. In one embodiment, the order is for rental of consumer video 160. In another embodiment, the order is for purchase of consumer video 160.

In one embodiment, commerce network 135 includes the Internet; consumer 110 orders consumer video 160 at an electronic commerce (e-commerce) portal operated by online video merchant 130. In one embodiment, commerce network 135 includes a telephony network, such as Public Switched Telephone Network (PSTN), or a public Voice over IP (VoIP)

telephone network. Consumer 110 orders consumer video 160 over a telephone call to online video merchant 130.

Online video merchant 130 delivers consumer video 160 to online video portal 150 over video delivery network 155. Online video portal 150 stores consumer video 160 for consumer 110. In one embodiment, video delivery network 155 is based on Internet Protocol (IP). In one embodiment, video delivery network 155 includes an enterprise data network. In one embodiment, video delivery network 155 includes a Virtual Private Network (VPN). In one embodiment, video delivery network 155 includes an Extranet.

Figure 2:
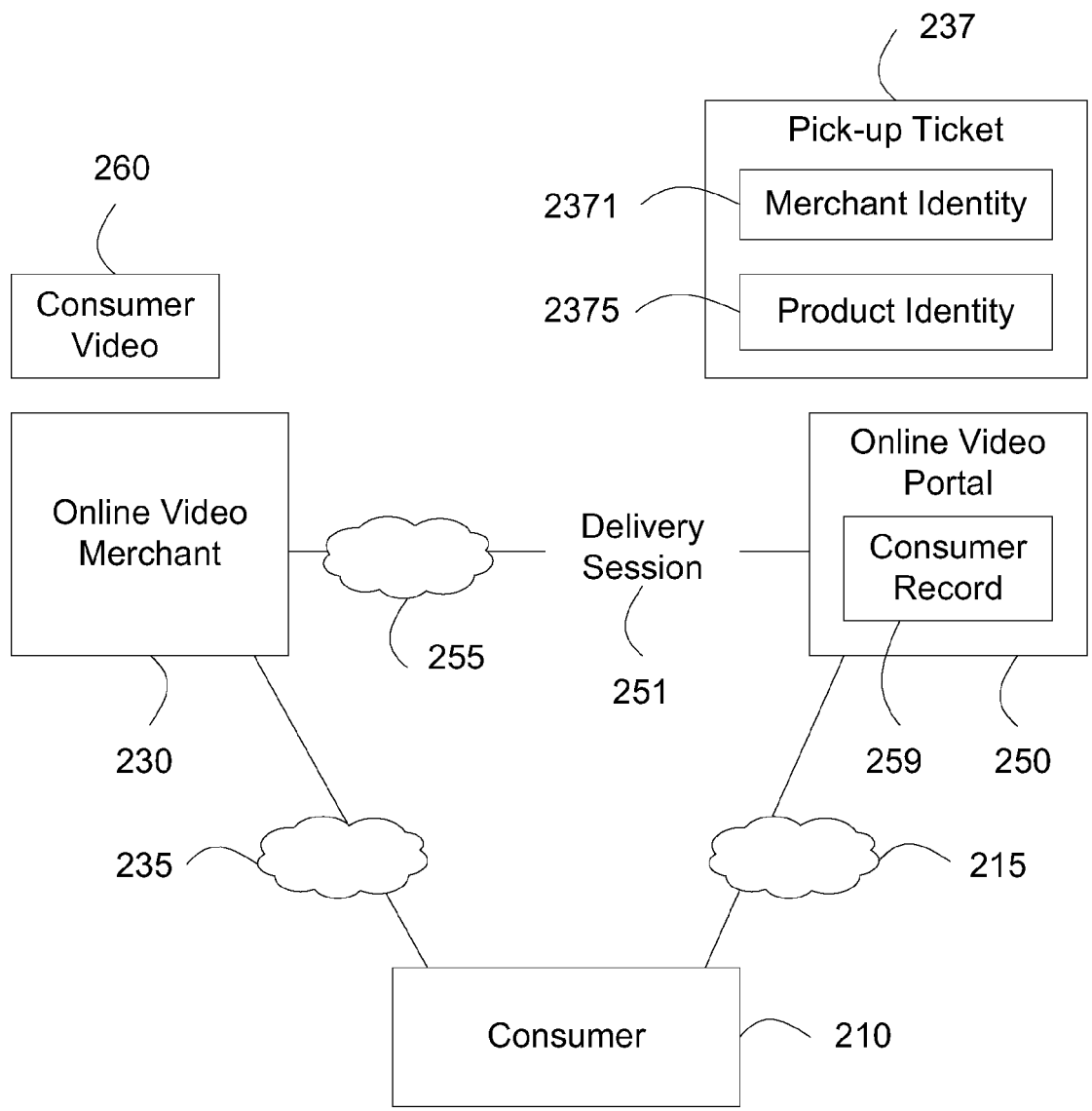
FIG. 2 illustrates an online consumer video order delivery using a pick up ticket.

FIG. 2 illustrates an online consumer video order delivery using a pick up ticket.

Consumer 210 subscribes to online video portal 250. Online video portal 250 includes a consumer record 259 associated with consumer 210. Consumer 210 orders consumer video 260 from online video merchant 230 over commerce network 235 and requests online video merchant 230 to deliver consumer video 260 to online video portal 250.

Online video merchant 230 provides a pick-up ticket 237 to consumer 210 over commerce network 235. Pick-up ticket 237 includes merchant identity 2371 of online video merchant 230 and product identity 2375 of consumer video 260.

Consumer 210 provides pick-up ticket 237 to online video portal 250 over subscription network 215.

In one embodiment, consumer 210 provides pick-up ticket 237 using a proprietary technology based on, for example, Remote Method Invocation (RMI). In one embodiment, consumer 210 provides pick-up ticket 237 using a Web service. In one embodiment, consumer 210 provides pick-up ticket 237 using Hypertext Transfer Protocol (HTTP). In one embodiment, consumer 210 provides pick-up ticket 237 over a telephone call to online video portal 250. Online video portal 250 stores pick-up ticket 237 in consumer record 259.

Online video portal 250 uses pick-up ticket 237 to pick up consumer video 260 for consumer 210.

In one embodiment, merchant identity 2371 includes a Web address or a Uniform Resource Locator (URL). Online video portal 250 connects to online video merchant 230 using the Web address. In one embodiment, merchant identity 2371 includes a name of online video merchant 230. Online video portal 250 obtains a Web address based on the name. In one embodiment, online video portal 250 obtains the Web address by matching the name against a lookup table, or by querying a database. In one embodiment, online video portal 250 and online video merchant 230 has an Extranet connection. Merchant identity 2371 includes information for connecting to online video merchant 230 via the Extranet. Online video portal 250 connects to online video merchant 230 via the Extranet.

In one embodiment, online video portal 250 establishes a delivery session 251 with online video merchant 230 over video delivery network 255. Online video portal 250 provides product identity 2375 to online video merchant 230 over delivery session 251. In one embodiment, product identity 2375 includes a Universal Product Code (UPC). In one embodiment, product identity 2375 includes an International Standard Audiovisual Number (ISAN). In one embodiment, product identity 2375 includes a merchandise number, a product tracking number or an inventory number. In one embodiment, product identity 2375 includes a title of consumer video 260. In one embodiment, product identity 2375 includes a product tracking number specific to online video merchant 230, such as Amazon Standard Identification Number (ASIN). In one embodiment, product identity 2375 is associated with an order transaction record for consumer video 260. In one embodiment, delivery session 251 includes an HTTP session; online video portal 250 provides product identity 2375 over the HTTP session.

Online video merchant 230 uses product identity 2375 to retrieve consumer video 260. Online video merchant 230 sends consumer video 260 to online video portal 250 over delivery session 251. In one embodiment, delivery session 251 includes a file transfer session wherein online video merchant 230 sends consumer video 260 over the file transfer session. In one embodiment, the file transfer session is based on File Transfer Protocol (FTP), FTP over Secure Shell (SSH), or FTP/SSL technology. In one embodiment, delivery session 251 includes an HTTP session wherein online video merchant 230 sends consumer video 260 as entity body over the HTTP session. In one embodiment, delivery session 251 is based on Web Service technology. In one embodiment, delivery session 251 is based on cXML, or e-business XML (ebXML) technology.

In a different embodiment, merchant identity 2371 includes a street address. Online video portal 250 goes to the street address and presents product identity 2375 to online video merchant 230. Online video merchant 230 puts consumer video 260 in a physical digital media such as a DVD, a Blu-Ray (BR) optical disc, or a hard disk. Online video merchant 230 gives the physical digital media to online video portal 250. In one embodiment, online video portal 250 uses a courier service to pick up consumer video 260 at the street address.

Online video portal 250 receives consumer video 260 and stores consumer video 260 in consumer record 259.

Online video portal 250 notifies consumer 210 after receiving consumer video 260. In one embodiment, consumer record 259 includes contact information for consumer 210, such as an email address or a telephone number. In one embodiment, online video portal 250 sends a notification email to the email address. In another embodiment, online video portal 250 notifies consumer 210 over a telephone call. In one embodiment, online video portal 250 notifies consumer 210 using a Short Message Service (SMS). In one embodiment, online video portal 250 presents an alert message the next time consumer 210 accesses online video portal 250 over subscription network 215.

In one embodiment, online video merchant 230 notifies consumer 210 after sending consumer video 260. In one embodiment, online video merchant 230 retrieves the order transaction record associated with product identity 2375. The order transaction record includes contact information for consumer 210 such as an email address or a telephone number. Online video merchant 230 notifies consumer 210 using the contact information.

In one embodiment, consumer 210 specifies a storage location when providing pick-up ticket 237 to online video portal 250. In one embodiment, the storage location includes a folder name. Online video portal 250 stores the storage location in consumer record 259 along with pick-up ticket 237. After receiving consumer video 260, online video portal 250 stores consumer video 260 in the storage location.

In one embodiment, online video portal 250 picks up consumer video 260 immediately after receiving pick-up ticket 237. In one embodiment, online video portal 250 picks up consumer video 260 at a scheduled time. In one embodiment, the scheduled time is included in pick-up ticket 237. In one embodiment, online video portal 250 schedules pick up at every hour at the hour, every other hour, or after 6:00 pm. In one embodiment, online video portal 250 schedules bulk pick up for a plurality of consumer videos including consumer video 260.

In one embodiment, merchant identity 2371 includes a key. Online video merchant 230 validates the key before sending consumer video 260. In one embodiment, product identity 2375 includes a key. Online video merchant 230 validates the key before sending consumer video 260.

Figure 3:
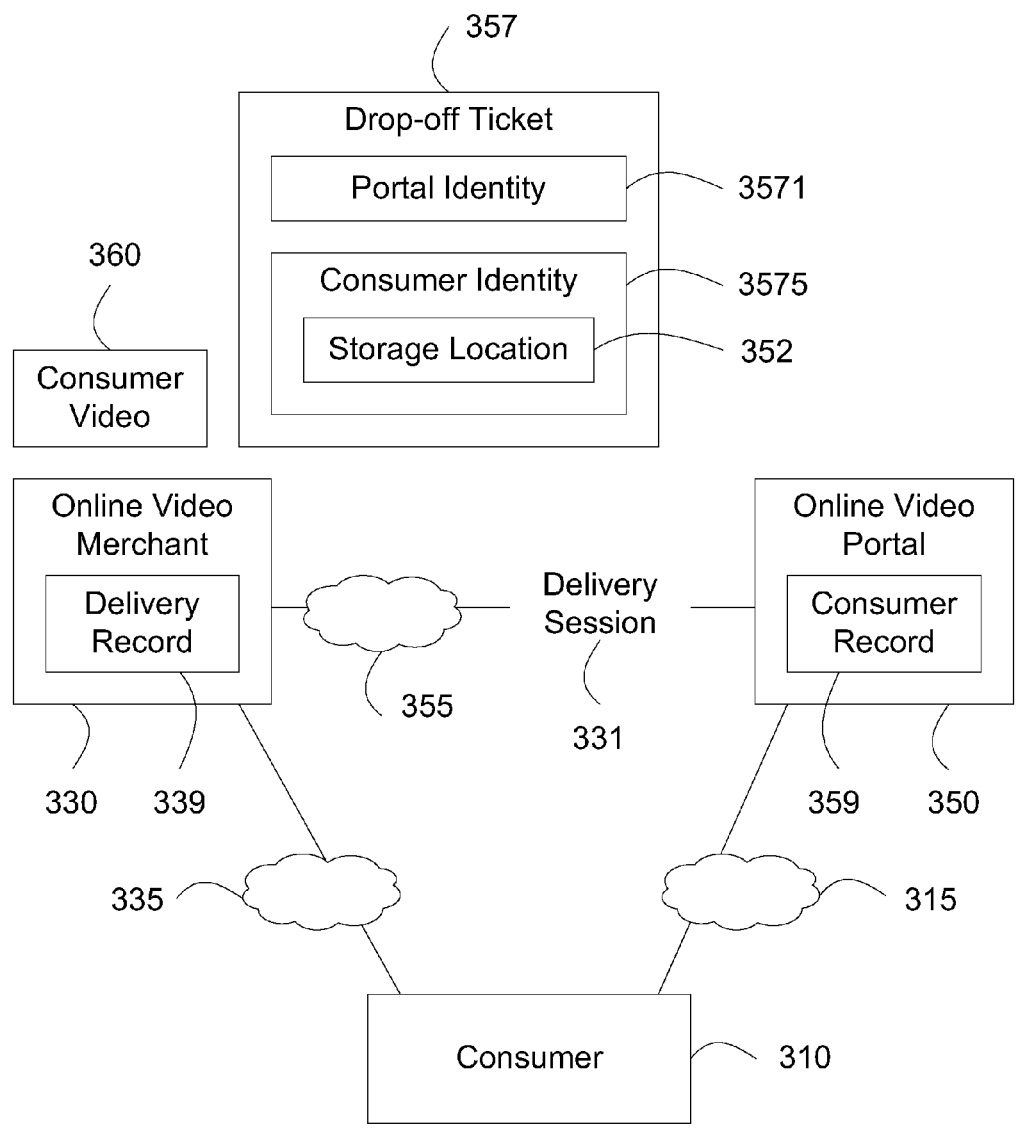
FIG. 3 illustrates a process to deliver an online consumer video order using a drop off ticket.

FIG. 3 illustrates a process to deliver an online consumer video order using a drop off ticket.

Consumer 310 subscribes to online video portal 350. Online video portal 350 includes a consumer record 359 associated with consumer 310. Consumer 310 orders consumer video 360 from online video merchant 330 over commerce network 335 and requests online video merchant 330 to deliver consumer video 360 to online video portal 350.

Consumer 310 obtains a drop-off ticket 357 from online video portal 350 over subscription network 315. Drop-off ticket 357 includes portal identity 3571 of online video portal 350 and consumer identity 3575 of consumer 310. In one embodiment, consumer 310 specifies a storage location 352 wherein online video portal 350 includes storage location 352 in consumer identity 3575. In one embodiment, storage location 352 includes a folder name.

Consumer 310 provides drop-off ticket 357 to online video merchant 330 over commerce network 335. Online video merchant 330 stores drop-off ticket 357. In one embodiment, online video merchant 330 stores drop-off ticket 357 in a delivery record 339 associated with consumer video 360.

Online video merchant 330 uses delivery record 339 to drop off consumer video 360.

In one embodiment, portal identity 3571 includes a Web address or a Uniform Resource Locator (URL). Online video merchant 330 connects to online video portal 350 using the Web address. In one embodiment, portal identity 3571 includes a name of online video portal 350 and online video merchant 330 obtains a Web address based on the name. In one embodiment, online video merchant 330 obtains the Web address by matching the name against a lookup table, or by querying a database In one embodiment, online video merchant 330 and online video portal 350 has an Extranet connection and portal identity 3571 includes information for connecting to online video portal 350 via the Extranet. Online video merchant 330 connects to online video portal 350 via the Extranet.

In one embodiment, online video merchant 330 establishes a delivery session 331 with online video portal 350 over video delivery network 355. Online video merchant 330 provides consumer identity 3575 to online video portal 350 over delivery session 331. In one embodiment, delivery session 331 includes an HTTP session; online video merchant 330 provides consumer identity 3575 over the HTTP session.

Online video merchant 330 sends consumer video 360 to online video portal 350 over delivery session 331. In one embodiment, delivery session 331 includes a file transfer session wherein online video merchant 330 sends consumer video 360 over the file transfer session. In one embodiment, the file transfer session is based on FTP/SSH, or FTP/SSL technology. In one embodiment, delivery session 331 is based on cXML, or E-Business XML (ebXML) technology. In one embodiment, delivery session 331 is based on Web Service technology.

In a different embodiment, portal identity 3571 includes a street address. Online video merchant 330 provides consumer identity 3575 and sends consumer video 360 stored in a physical digital media to the street address. In one embodiment, online video merchant 330 uses postal service, a package delivery company such as United Parcel Service (UPS), or Federal Express (FedEx) to send consumer video 360 to the street address. In another embodiment, online video merchant 330 uses a third party video delivery business entity to send consumer video 360.

Online video portal 350 receives consumer video 360 and consumer identity 3575. Online video portal 350 determines consumer record 359 based on consumer identity 3575. Online video portal 350 stores consumer video 360 in consumer record 359. In one embodiment, consumer identity 3575 includes storage location 352. Online video portal 350 stores consumer video 360 in storage location 352.

Online video portal 350 notifies consumer 310 after receiving consumer video 360. The notification includes consumer video 360 identity and storage location 352. In one embodiment, consumer record 359 includes contact information for consumer 310, such as an email address or a telephone number. In one embodiment, online video portal 350 sends a notification email to the email address. In another embodiment, online video portal 350 notifies consumer 310 over a telephone call. In one embodiment, one line video portal 350 notifies consumer 310 using a Short Message Service (SMS). In one embodiment, online video portal 350 presents an alert message that consumer video 360 is stored in storage location 352 the next time consumer 310 accesses online video portal 350.

In one embodiment, online video merchant 330 notifies consumer 310 after sending consumer video 360. In one embodiment, delivery record 339 is associated with contact information for consumer 310, such as an email address or a telephone number. Online video merchant 330 notifies consumer 310 using the contact information.

In one embodiment, online video merchant 330 drops off consumer video 360 immediately after storing drop-off ticket 357. In one embodiment, online video merchant 330 drops off consumer video 360 at a later time. In one embodiment, online video merchant 330 drops off consumer video 360 after an electronic fund transfer transaction for consumer video 360 is completed. In one embodiment, online video merchant 330 drops off consumer video 360 after an electronic fund transfer is approved. In one embodiment, online video merchant 330 drops off consumer video 360 along with other consumer videos in a bulk delivery to online video portal 350. In one embodiment, online video merchant 330 completes an electronic fund transfer transaction after completing delivery of consumer video 360.

In one embodiment, consumer identity 3575 includes a key. In one embodiment, online video portal 350 validates the key before receiving consumer video 360.

In one embodiment, a second consumer subscribes to online video portal 150. Consumer 110 requests online video merchant 130 to deliver consume video 160 to online video portal 150 for the second consumer. In one embodiment, after receiving consumer video 160, online video portal 150 notifies the second consumer as well as consumer 110.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for online consumer video order delivery, comprising:
   (a) sending, by an online video portal computing device, a drop-off ticket to a consumer computing device, wherein the drop-off ticket comprises a portal identity of an online video portal and a consumer identity of a consumer;
   (b) receiving, by the online video portal computing device, the consumer identity and a consumer video sent by an online video merchant computing device, wherein the receiving comprises;
      (b1) receiving, by the online video merchant computing device, an order for the consumer video and a request to deliver the consumer video to the online video portal computing device sent by the consumer computing device;
      (b2) receiving, by the online video merchant computing device, the drop-off ticket sent by the consumer computing device;
      (b3) in response to receiving the drop-off ticket sent by the consumer computing device, connecting to the online video portal computing device by the online video merchant computing device using the portal identity in the drop-off ticket; and
      (b4) sending the consumer video and the consumer identity in the drop-off ticket to the online video portal computing device by the online video merchant computing device;
   (c) in response to receiving the consumer identity and the consumer video sent by the online video merchant, determining a consumer record associated with the consumer identity by the online video portal computing device; and
   (d) storing the consumer video in the consumer record by the online video portal computing device.

2. The method of claim 1, wherein the consumer identity comprises a storage location, wherein the storing (d) comprises:
   (d1) storing the consumer video at the storage location by the online video portal computing device.

3. The method of claim 1, further comprising:
   (e) in response to receiving the consumer video sent by the online video merchant computing device, sending, by the online video portal computing device, a notification to the consumer computing device of receipt of the consumer video by the online video portal computing device.

4. A method for online consumer video order delivery, comprising:
   (a) receiving, by an online video merchant computing device, an order for a consumer video and a request to deliver the consumer video to an online video portal computing device sent by a consumer computing device;
   (b) receiving, by the online video merchant computing device, a drop-off ticket sent by the consumer computing device, wherein an online video portal computing device sent the drop-off ticket to the consumer computing device, wherein the drop-off ticket comprises a portal identity of the online video portal and a consumer identity of a consumer;
   (c) in response to receiving the drop-off ticket sent by the consumer computing device, connecting to the online video portal computing device by the online video merchant computing device using the portal identity in the drop-off ticket;
   (d) sending the consumer video and the consumer identity in the drop-off ticket to the online video portal computing device by the online video merchant computing device, wherein the sending comprises:
      (d1) receiving, by the online video portal computing device, the consumer identity and the consumer video sent by the online video merchant computing device;
      (d2) in response to receiving the consumer identity and the consumer video sent by the online video merchant computing device, determining a consumer record associated with the consumer identity by the online video portal computing device; and
      (d3) storing the consumer video in the consumer record by the online video portal computing device.

5. The method of claim 4, further comprising:
   (e) in response to receiving the consumer video sent by the online video merchant computing device, sending, by the online video merchant computing device, a notification to the consumer computing device that the consumer video has been sent by the online video merchant computing device.

* * * * *